United States Patent [19]

Narahara et al.

[11] Patent Number: 5,138,603
[45] Date of Patent: Aug. 11, 1992

[54] SYSTEM AND METHOD FOR PROCESSING OPTICAL INFORMATION WITH TRACKING ERROR COMPENSATED

[75] Inventors: Tatsuya Narahara; Masahiko Chaya, both of Kanagawa, Japan

[73] Assignee: Sony Corporation, Japan

[21] Appl. No.: 273,082

[22] Filed: Nov. 18, 1988

[30] Foreign Application Priority Data

Nov. 28, 1987 [JP] Japan .............................. 62-301271

[51] Int. Cl.$^5$ .......................... G11B 3/74; G11B 7/00
[52] U.S. Cl. .................................. 369/97; 369/44.12; 369/44.14; 369/100; 369/112; 369/121; 369/124
[58] Field of Search ................. 369/44.12, 44.14, 97, 369/100, 112, 121, 124

[56] References Cited

U.S. PATENT DOCUMENTS

| | | | |
|---|---|---|---|
| 3,851,951 | 12/1974 | Eveleth | 350/161 |
| 4,531,206 | 7/1985 | Kimura | 369/44.13 |
| 4,677,603 | 6/1987 | Kenjyo | 369/44.28 |
| 4,731,771 | 3/1988 | Maeda et al. | 369/44.25 |
| 4,772,950 | 9/1988 | Furuhata et al. | 360/36.1 |
| 4,783,774 | 11/1988 | Enomoto | 369/44.27 |
| 4,817,069 | 3/1989 | Shigemori | 369/44.28 |
| 4,862,440 | 8/1989 | Miyamoto et al. | 369/112 |
| 4,884,260 | 11/1989 | Bouldin et al. | 369/93 |
| 4,889,415 | 12/1989 | Umezu | 369/44.23 |
| 4,901,297 | 2/1990 | Komatsu et al. | 369/13 |

Primary Examiner—Stuart S. Levy
Assistant Examiner—Tan Nguyen
Attorney, Agent, or Firm—Ronald P. Kananen

[57] ABSTRACT

A system and method for processing an optical information on an optical record medium are disclosed in which a timing at which a scanning of a light spot on one record track of the optical record medium derived from an acoustooptic deflector is started is controlled on the basis of a tracking error signal indicating that a scanning trajectory of the light spot is deviated from a center line of the one record track on the optical record medium. Therefore, the light spot can accurately be tracked on each record track on the high density optical record medium such as a tape in a simple construction.

9 Claims, 5 Drawing Sheets

SYSTEM AND METHOD FOR PROCESSING OPTICAL INFORMATION WITH TRACKING ERROR COMPENSATED

BACKGROUND OF THE INVENTION

(1) Field of the Invention

The present invention relates generally to a system and method for processing an optical information with a tracking error compensated.

The present invention more specifically relates to the optical information processing system and method which record and/or reproduce the optical information on and/or from record tracks on a card or tape type optical record medium using a particular acoustooptic deflector (AOD), with tracking error detected and compensated.

(2) Background of the Art

Various kinds of optical information processing systems have recently been proposed.

In one of such optical information processing systems, a light spot formed of, e.g., a converged laser light flux is used to scan, e.g., over a tape type optical record medium in a direction transverse to a direction toward which the tape type record medium runs so that the optical information is written or read on each record track.

A diameter of the light spot can be converged to, e.g., approximately one micrometer, in a case where the laser light having a waveform length of 780 nanometers is used.

Hence, if the multiple record tracks are formed with, for example, guard bands sandwiched between each record track and the optical information can be reproduced from the respective record tracks, the light spot is formed having an extremely small spot diameter, the record tracks can be arranged so as to mutually close together and with high density. Thus, the more higher density optical information can be recorded or reproduced.

A U.S. Pat. No. 3,851,951 issued on Dec. 3, 1974 exemplifies means for producing the light spot to scan the record tracks in the direction traverse to the running direction of the optical record medium using an acoustooptic deflection element of an anisotorphic Bragg diffraction type.

Figure 7:
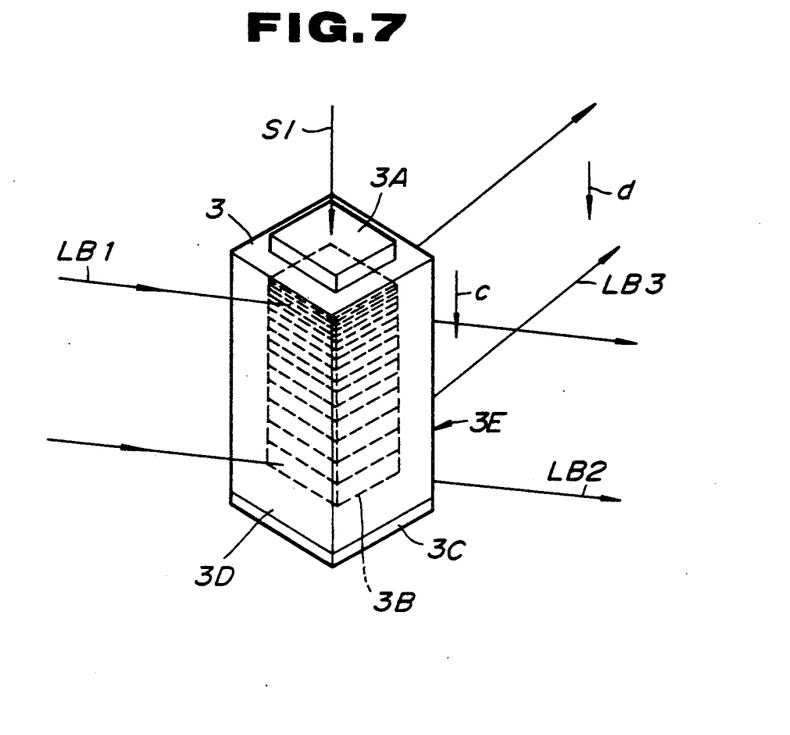
FIG. 7 is a schematic perspective view of a construction of an acoustooptic deflection element used in the optical information processing system.
Figure 8:
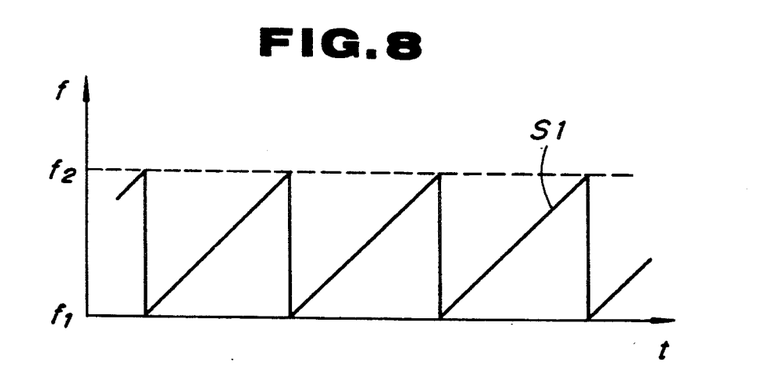
FIG. 8 is a signal waveform chart of a drive signal for the acoustooptic deflection element used in the optical information processing system.

The acoustooptic deflection element generally has a rectangular shape in a longitudinal cross section and a drive signal $S_1$ is supplied to a transducer installed on one end surface thereof, the drive signal $S_1$ being formed of saw-tooth wave such that a frequency f is changed from a lower limit frequency $f_1$ to an upper limit frequency $f_2$ with time (refer to FIG. 8). A sonic pattern 3B whose density is gradually changed in the elongated direction c of the element 3 is formed in the acoustooptic deflection element 3 and is travelled in a direction c toward which an absorbing member 3C is installed on the other end surface of the deflection element 3 (refer to FIG. 7).

The sonic pattern 3B acts as a diffraction grating when each light beam LB1 incident on an incident surface 3D constituted by a linear polarization on the acoustooptic deflection element 3 transmits into the acoustooptic deflection element 3. Therefore, the light beams are diffracted by means of the sonic pattern 3B, so that a diffraction angle of a first-order diffraction light LB3 with respect to a zero-order diffraction light LB2 is changed as the density of the sonic pattern 3B is changed according to the change in the frequency f of the drive signal $S_1$. Consequently, the light spot 2 can be achieved which scans along the elongated direction d of the acoustooptic deflection element 3. However, the previously proposed optical information processing systems have problems described below.

When the optical information is reproduced from the record tracks, a so-called tracking error occurs in the light spot. The tracking error causes a bit error during the reproduction of the optical information and in a worst case the reproduction of the optical information becomes difficult.

To solve the above-described tracking error problem, an amount of deviation of a scanning trajectory of the light spot from a center line of each record track (that is to say, a tracking error) is detected and the light spot is controlled in such a way that the scanning trajectory of the light spot has aligned with the center line of each record track TR (hereinafter referred also to as a just tracking state).

For example, a technique of tracking control used in, e.g., a video tape recorder is applied to the optical information processing system in such a way that a phase control for a running system of the optical record medium is carried out for the tracking control of the record tracks.

However, in a case where the phase of the running system is controlled, it is difficult to increase a speed of response in the running system. In addition, the phase control cannot actually be applied to such kinds of the optical information processing systems.

Furthermore, it is necessary to perform the tracking control with high gain and with high accuracy in such kinds of the optical information processing systems.

In this case, if a gain of the tracking control is increased and a range of frequency of a response in a tracking control system is extended to achieve a high accuracy of the tracking control, it is difficult to increase the response speed of the running system. Therefore, a jitter occurs during the run of the optical recording medium.

On the other hand, a method has been proposed in which an object lens is arranged between the acoustooptic deflection element and optical record medium and the object lens is driven in response to a detection result of the tracking error.

However, when the above-described method is applied to such optical information processing systems, a drive system to drive the object lens becomes necessary and the whole construction accordingly becomes complex.

In addition, such a problem as to increase the response speed of the tracking control actually occurs when the object lens is driven.

Another method has been proposed in which a galvano mirror is used in place of the acoustooptic deflection element to produce a scanning light beam and the galvano mirror is driven and controlled on the basis of the tracking error.

However, in the above-described other method, a scale of the optical system having the galvano mirror is enlarged.

The whole construction of the optical information processing system becomes complex.

When the light beams are deflected by means of the galvano mirror a light path difference occurs in the scanning light beams and a drive system such as an actuator becomes necessary.

Consequently, the whole construction accordingly becomes enlarged.

SUMMARY OF THE INVENTION

It is therefore an object of the present invention to provide an improved system and method for processing an optical information which can carry out a tracking control for a scanning trajectory of a light spot with a simple construction.

The above-described object can be achieved by providing a system for processing an optical information on an optical record medium, comprising: (a) first means for supplying a drive signal to an acoustooptic deflector (AOD), the drive signal being such that a frequency thereof is changed in a saw-tooth waveform, a sonic pattern is formed in response to the drive signal which travels in a predetermined direction with time in the acoustooptic deflector, and a diffraction action of the sonic pattern causing a light flux irradiated from the acoustooptic deflector to converge into a scanning light beam to form a light spot scanning on record tracks formed on the optical record medium; (b) second means for detecting a tracking error during the scanning of the light spot on each record track by which a scanning trajectory of the light spot is deviated from a center line of each record track; and (c) third means for controlling a timing of the drive signal supplied from the first means to the acoustooptic deflector the basis of the result of tracking error detection by the second means, the timing at which one scanning effective interval of the light spot on the one record track defined by the change in the frequency of the drive signal starts subsequent to an end of the other one scanning effective interval of the light spot on the preceding record track.

The above-described object can also be achieved by providing a method for processing an optical information comprising the steps of: (a) supplying a drive signal to an acoustooptic deflector, the drive signal being such that a frequency thereof is changed in a form of a saw-tooth wave so that a sonic pattern is formed which travels in a predetermined direction within the acoustooptic deflector and a scanning light beam which is a convergence of an irradiated light flux of the acoustooptic deflector by means of a diffraction of the sonic pattern is derived, thus forming a light spot scanning on a record track on the optical medium; (b) detecting a tracking error of the light spot with respect to the record track; (c) controlling a timing at which one effective scanning interval of the light spot for the record track is started subsequent to the effective scanning interval for the preceding record track; and (d) repeating the steps (a) to (c).

DETAILED DESCRIPTION OF THE PREFERRED EMBODIMENT

Reference will hereinafter be made to the drawing in order to facilitate understanding of the present invention.

Figure 1:
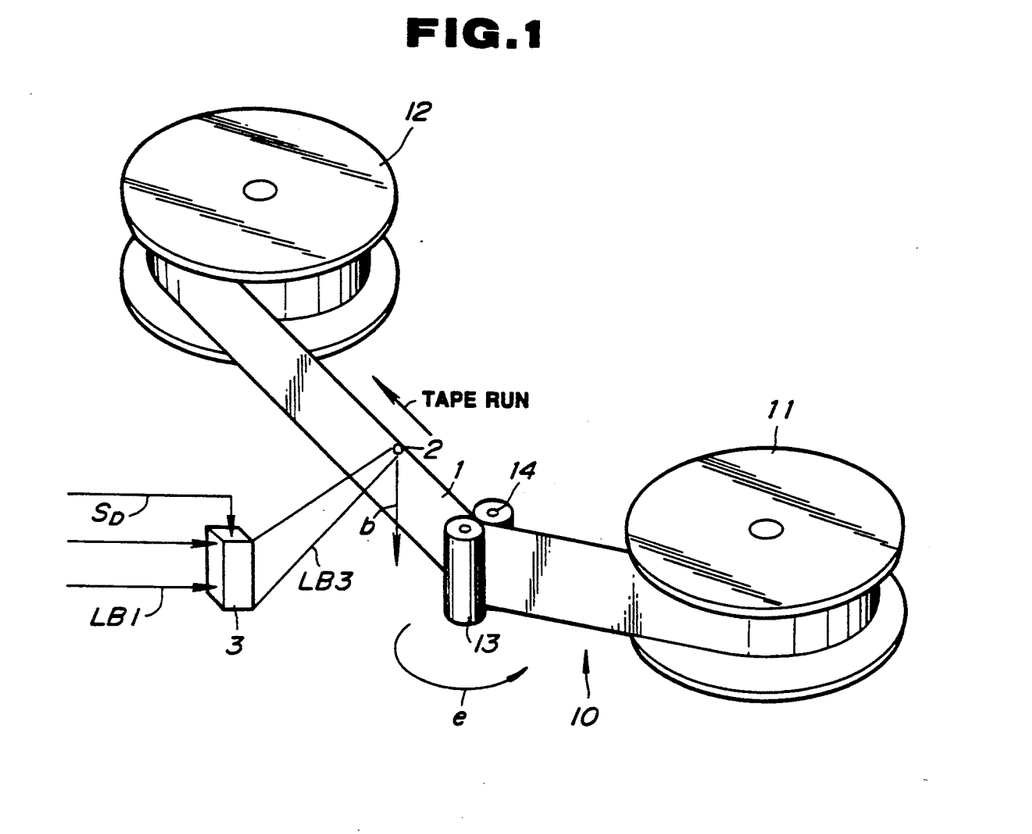
FIG. 1 is a perspective view of a system for processing an optical information in a preferred embodiment according to the present invention.

FIG. 1 shows an optical information processing system in a preferred embodiment according to the present invention.

In FIG. 1, the optical information processing system generally denoted by 10 records and/or reproduces an optical information on a tape type optical record medium 1 which is supplied from a supply reel 11 and wound on a winding reel 12.

A capstan 13 driven by means of a capstan motor (not shown) passes an optical record medium 1 along its peripheral surface together with a pinch roller 14 and is rotated at a predetermined speed in a direction denoted by e with an arrow so that the optical record medium 1 runs at a constant speed.

Figure 6:
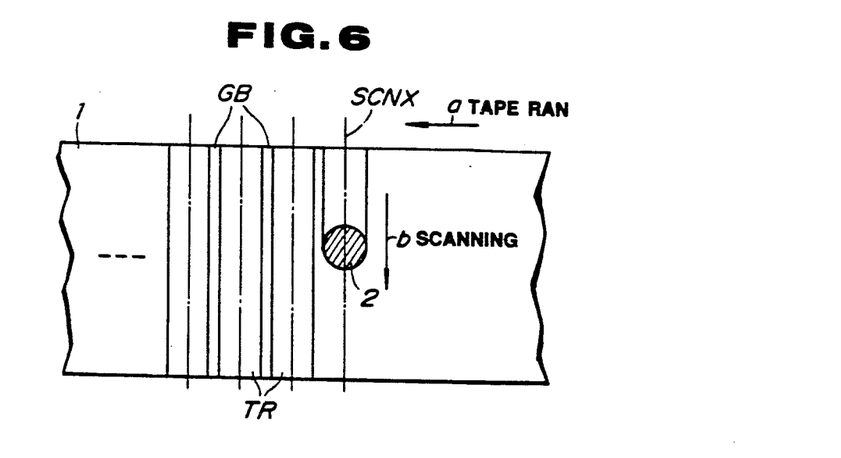
FIG. 6 is a schematic view of a construction of the optical record medium.

A construction and operation of an acoustooptic deflection element (AOD) 3 shown in FIG. 1 has already been described in the Background of the art of the present specification with reference to FIGS. 6 to 8.

In the acoustooptic deflection element 3, a timing at which the scanning of the light spot 2 on one record track is started in a direction denoted by b in FIG. 1 on the basis of a drive signal $S_D$ is variably controlled for the constantly running optical record medium 1, so that each record track on the optical record medium 1 has just been been tracked (, i.e., the scanning trajectory of the light spot is aligned to each center line SCNX of the record tracks).

Figure 2:
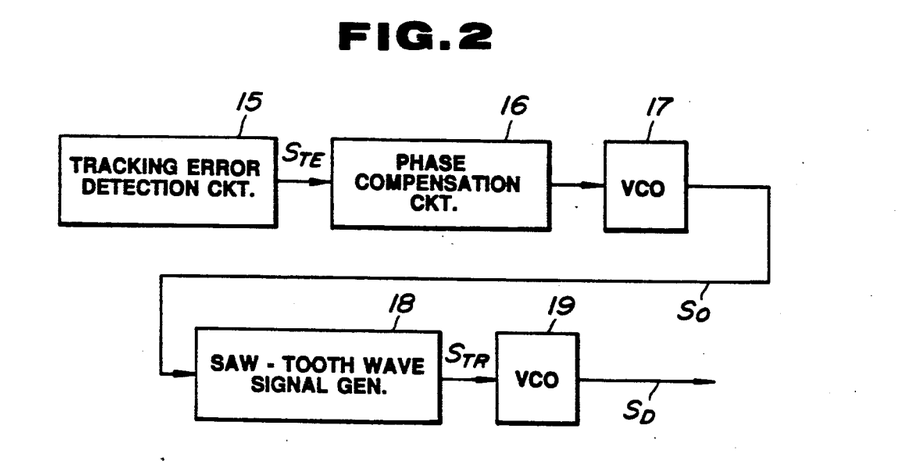
FIG. 2 is a circuit block diagram of a tracking control circuit in the optical information processing system shown in FIG. 1.

FIG. 2 shows a tracking control circuit in the optical information processing apparatus 10.

In FIG. 2, a tracking error detection circuit 15 detects a tracking error of the light spot 2 with respect to the center line SCNX of each record track TR and outputs a tracking error signal $S_{TE}$ whose signal level changes according to the error of a tracking trajectory to be described later.

A method for detecting the tracking error is exemplified by a Japanese Patent Application No. sho 62-217460 filed on Aug. 31, 1987.

Figure 9:
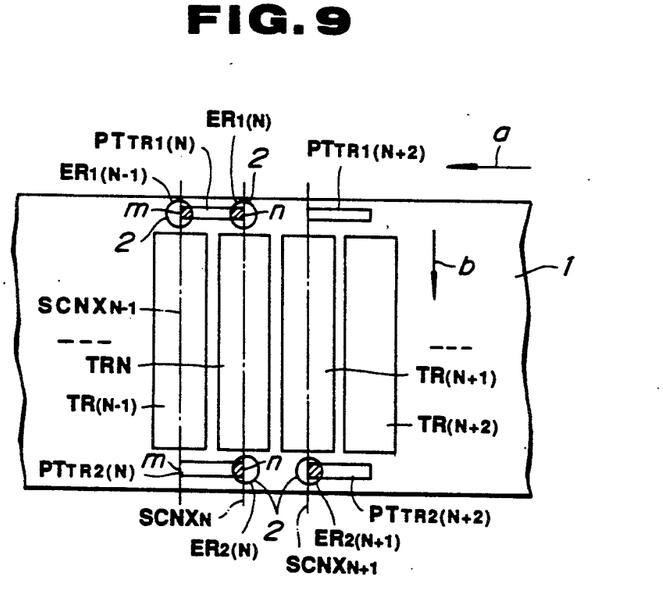
FIG. 9 is a explanatory view of an optical record medium for explaining a method for detecting a tracking error disclosed in a Japanese Patent Application sho 62-217460.

That is to say, in the above-identified Japanese Patent Application, for each record track TR, first and second tracking patterns $PT_{TR1(N)}$, $PT_{TR2(N)}$ shown in FIGS. 6 and 9, e.g., having different reflectivities from the optical record medium 1 are formed onto the optical record medium 1 between an upper elongated end of the optical record medium 1 and upper end of each record track TR and between a lower elongated end of the optical record medium 1 and lower end of the record track TR, respectively.

It is noted that each trailing end m and each leading end n of the tracking patters $PT_{TR1(N)}$, $PT_{TR2(N)}$ with respect to the center line SCNX of each record track TR.

Figure 5:
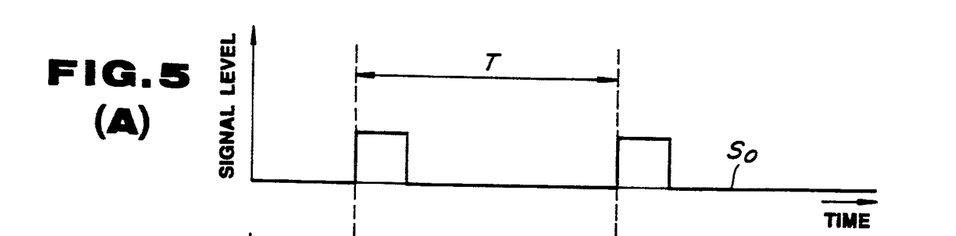
FIGS. 5(a)–5(c) are a signal waveform chart for explaining the operation of the optical information processing system.

Then, the tracking error information is obtained at the interval during which the frequency of the drive signal $S_D$ supplied to the acoustooptic deflection element 3 changes from the upper limit value $f_2$ to the lower limit value $f_1$ (tracking error detection interval T1 shown in FIG. 5 (C)), i.e., when the scanning spot light 2 scans the first and second tracking patterns $PT_{TR1(N)}$, $PT_{TR2(N)}$.

For example, as shown in FIG. 9, when the tracking error information is derived from the sequential scanning of the light spot 2 on the record tracks $TR_{(N-1)}$, $TR_{(N)}$, and $TR_{(N+1)}$, the following equations (1) and (2) are established on the basis of the tracking error information $ER_{1(N-1)}$ and $ER_{1(N)}$ derived from the trailing and leading ends m and n of the first tracking pattern $PT_{TR1(N)}$ from which the corresponding record track scanning is started and the tracking error information $ER_{2(N)}$ and $ER_{2(N+1)}$ derived from the leading end n of the second tracking pattern $PT_{TR2(N)}$ and the trailing end m of the adjacent tracking pattern $PT_{TR2(N+2)}$.

$$INF_{(N-1)(N)} = ER_{1(N-1)} - ER_{2(N)} \quad (1)$$

$$INF_{(N)(N+1)} = ER_{1(N)} - ER_{2(N+1)} \quad (2)$$

Figure 4:
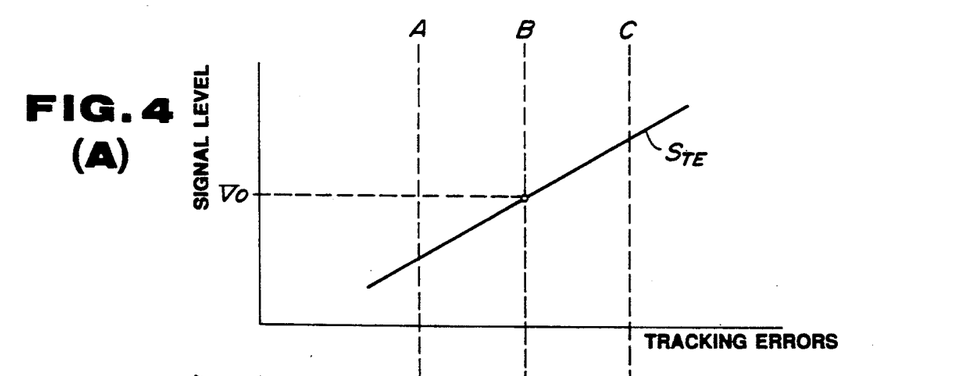
FIGS. 4(a)–4(b) are a characteristic graph for explaining an operation of the optical information processing system.

Then, from the above-described tracking information $INF_{(N-1)(N)}$ and $INF_{(N)(N+1)}$, the tracking error indicating a parallel deviation (advance or retardation) of the light spot 2 in the scanning direction b to the tape run direction a can be detected. Consequently, the signal $S_{TE}$ shown in FIG. 4 (A) is produced on the basis of the derived tracking error information $INF_{(N-1)(N)}$ and $INF_{(N)(N+1)}$.

Figure 3:
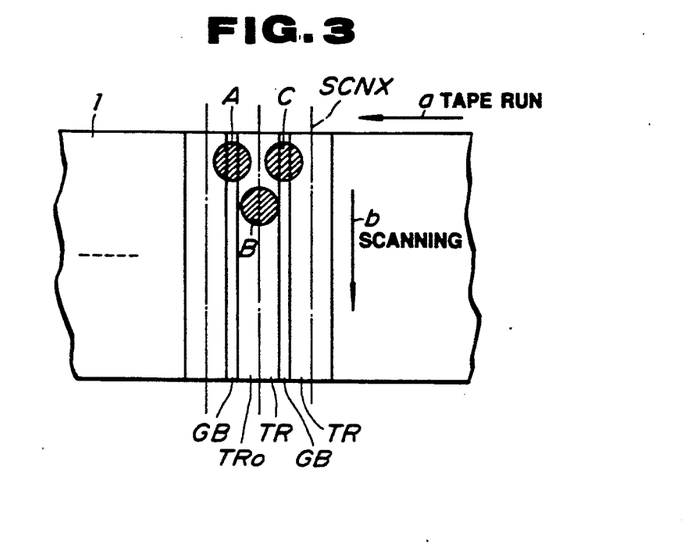
FIG. 3 is a schematic view of an optical record medium shown in FIG. 1.

In this case, as shown in FIGS. 3 and 4, the light spot 2 has just been tracked on the center line SCNX of the record track $TR_0$ which is a target object of tracking (in a state denoted by B in FIG. 3), the signal level of the tracking error signal $S_{TE}$ indicates a $V_o$ [V] (refer to FIG. 4 (A)), and the tracking error occurs in the light spot 2 in either of directions of the tape run or opposite to the tape run (in either of the states denoted by A or C in FIG. 3 and A denotes an advance state and B denotes a retardation state). The signal level is reduced or increased with respect to the signal level $V_o$ [V]. The advance state A means that the scanning trajectory of the light spot 2 is deviated in the tape run direction a from the corresponding center line SCNX and the retardation state C means that the scanning trajectory is deviated in the direction opposite to the tape run direction a from the corresponding center line SCNX as appreciated from FIG. 3.

A phase compensation circuit 16 is constituted by a low-pass filter for compensating for a phase of the tracking error signal $S_{TE}$ derived from the tracking error detection circuit 15. The phase compensated signal from the phase compensation circuit 16 is supplied to a first voltage-controlled oscillator (VCO) 17.

The voltage-controlled oscillator 17 outputs a positive going pulse signal $S_0$ whose period T at which the signal level rises is changed according to the signal level of the tracking error signal $S_{TE}$ as shown in FIG. 5(A). In this case, the positive going pulse signal $S_0$ having a frequency $f_0$ [Hz] shown in FIG. 4 (B) is outputted from the voltage controlled oscillator 17 in a state where the light spot 2 has just has tracked on the corresponding record track (refer to FIG. 4(B) and FIG. 5(A)).

Hence, when the light spot 2 is in the advance state A, the period T of the positive going pulse $S_0$ is longer than that in the just tracking state described above. When the light spot 2 is in the retardation state C, the period T is shorter than that of the just tracking state B.

After a saw-tooth wave signal generating circuit 18 produces and outputs a saw-tooth wave signal $S_{TR}$ to a second voltage-controlled oscillator (VCO) 19 (refer to FIG. 5(B)), the saw-tooth wave signal being such that after rise at a predetermined voltage increase rate upon the receipt of the rising edge of the positive going pulse signal $S_0$, the signal straightly falls when the signal level reaches a predetermined level.

In this way, when the light spot 2 is in the advance state A, the period of T of the positive going pulse $S_0$ becomes longer. The period T1 becomes longer which is defined as the tracking error detection interval during a space of which the signal level of the saw-tooth signal $S_{TR}$ starts to fall and thereafter again starts to rise. On the contrary, when the light spot 2 is in the retardation state C, the period T1 becomes shorter.

The second voltage-controlled oscillator 19 outputs a drive signal $S_D$ (refer to FIG. 5(C)) whose frequency is changed according to the signal level of the saw-tooth wave signal $S_{TR}$ inputted thereto. The drive signal $S_D$ is supplied to the acoustooptic deflection element 3 in the same way as the drive signal denoted by $S_1$ shown in FIG. 8 (but the pattern of the drive signal is quite different).

Hence, when the scanning trajectory of the light spot 2 is in the advance state A, the interval T1 for which the frequency of the saw-tooth wave signal $S_D$ once falls and thereafter rises becomes longer. After the scanning of the light spot 2 is ended after an interval T2 for the single record track TR, the interval T1 after which the start of the scanning on the subsequent track is carried out during an interval T3 accordingly becomes longer. It is noted that the intervals of T2 and T3 are referred to as one effective scanning intervals.

On the contrary, when the light spot 2 is in the retardation state C, the interval T1 becomes shorter. The interval from a time at which the light spot 2 has ended the scanning on the single record track TR and thereafter the scanning on the subsequent track TR is started accordingly becomes shorter.

Hence, the timing at which the scanning trajectory of the light spot 2 starts is controlled so as to bring the light spot close to the just tracking state B. Consequently, the just tracking state B can be achieved.

Hence, the tracking error described above is detected without use of a mechanical driving system and the drive signal $S_D$ for the acoustooptic deflection element 3 is controlled in the optical information processing system of the preferred embodiment. Therefore, the tracking control for the light spot with the high response speed and high accuracy can be carried out in the simple construction.

In the above-described construction of the tracking error detection circuit 15, the tracking error signal $S_{TE}$ (refer to FIG. 4(A)) whose level is decreased and increased according to the advance and retardation states A and C with respect to the just tracking state B is obtained via the tracking error detection circuit 15 and the positive going pulse signal $S_0$ (refer to FIG. 4(B) and FIG. 5(A)) which changes its period T on the basis of the signal level of the tracking error signal $S_{TE}$.

The saw-tooth wave signal $S_{TR}$ (refer to FIG. 5 (B)) having the interval T1 from the time at which the signal level falls to the time at which the signal level again rises an which is changed on the basis of the positive going pulse signal $S_0$ is obtained and then the drive signal $S_D$ (refer to FIG. 5(C)) is obtained on the basis of the saw-tooth wave signal $S_{TR}$, whose frequency is changed so that the timing at which the subsequent one scanning interval T3 rises after the one scanning interval T2 is ended is controlled so as to bring the scanning trajectory of the light spot 2 in the just track state B.

Consequently, since the supply timing of the drive signal to the acoustooptic deflection element 3 at which the drive signal $S_D$ rises is controlled on the basis of the tracking error derived by the tracking error detection circuit 15, the whole construction of the optical information processing system can be simplified and the highly-accurate tracking control for the spot light can be achieved.

Although in the preferred embodiment the tracking error signal $S_{TR}$ is derived on the basis of the technique disclosed in the Japanese Patent Application sho 62-217460, the detection method of the tracking error is not limited. For example, a bit error rate is detected from the reproduced signal and the tracking control for the light spot is carried out so as to decrease the bit error rate. Other various methods may alternatively be applied to the tracking error detecting method.

Although, in the preferred embodiment, the positive going pulse $S_0$ such that its repetition rate is changed according to the signal level of the tracking error signal $S_{TE}$ is obtained, thereafter the saw-tooth wave signal $S_{TR}$ is formed to produce the drive signal $S_D$ and, consequently, the timing at which the frequency of the drive signal $S_D$ rises is controlled, the present invention is not limited to the above-described method but may be applied to another system where a timing at which a drive signal rises whose frequency is changed in the form of the saw-tooth wave signal.

Although, in the preferred embodiment, the tracking control for the single light spot 2 is carried out sequentially for each previously formed record track, the present invention can be applied to a multiple beam type optical information processing system in which the light spot for the tracking detection is scanned simultaneously together with light spot for the respective record tracks.

A card type optical record medium may alternatively be used as the optical record medium since the same effects as described above can be achieved.

Furthermore, although, in the preferred embodiment, the drive signal $S_D$ has such a waveform that the signal level rises at the predetermined increase rate in the saw-tooth waveform with time and thereafter abruptly falls, another drive signal having such a waveform that the signal level falls at a predetermined decrease rate in the saw-tooth waveform with time and thereafter abruptly rises may be used since the same effect as described above can be achieved.

As described hereinabove, the optical information processing system and method according to the present invention control a timing at which one effective scanning interval subsequent to the other one effective scanning interval rises after the end of the one scanning interval on the basis of the tracking error signal. Therefore, the highly accurate tracking control for the light spot on highly density record tracks can be achieved with the simple construction.

It will fully be appreciated by those skilled in the art that the foregoing description may be made in terms of the preferred embodiment and various changes and modifications may be made without departing from the scope of the present invention which is to be defined by the appended claims.

What is claimed is:

1. A system for processing optical information on an optical record medium, comprising:
   (a) an acoustooptic deflector means which receives a drive signal, the drive signal being such that a frequency thereof is changed in a saw-tooth waveform, wherein a sonic pattern is formed in response to the drive signal which travels in a predetermined direction with time in the acoustooptic deflector, and wherein a diffraction action of the sonic pattern causes flux irradiated from the accoustooptic deflector to converge into a scanning light beam to form a light spot for scanning on record tracks formed on the optical record medium;
   (b) first means for detecting, during the scanning of the light spot on each record track, a tracking error by which is scanning trajectory of the light spot is deviated from a center line of each record track and producing a first signal whose level corresponds to the tracking error detected by the first means;
   (c) second means for controlling a timimg of the drive signal supplied to said acoustooptic deflector means based on the tracking error detected by the first means, wherein the timing at which one effective scanning interval of the light spot on one record track defined by the change in the frequency of the drive signal starts subsequent to an end of an effective scanning interval of the light spot on a preceding record track, wherein the level of the first signal equals a predetermined level corresponding to a just tracking state when the scanning trajectory of the light spot is aligned with the center line of the one record track, has a level lower than the predetermined level and corresponding to an advanced state when the scanning trajectory of the light spot is advanced in a direction of a running of the optical record medium from the center line of the one record track and has a level higher than the predetermined level and corresponding to a retarded state when the scanning trajectory is retarded in a direction opposite to the optical record medium running direction;
   wherein the second means includes a phase compensator for compensating a phase of the first signal, a first voltage-controlled oscillator for producing a second signal whose rise period is changed according to the level of the first signal, a saw-tooth wave signal generator for producing a third signal whose level is changed according to the frequency of the second signal, and a second voltage-controlled oscillator for producing said drive signal supplied to said acoustooptic deflector means, wherein the frequency of the drive signal is changed according to the level change of the third signal; and
   wherein the drive signal derived from the second voltage-controlled oscillator is such that during the one effective scanning interval the frequency of the drive signal starts to increase at a predetermined rate to an upper limit frequency and then falls directly to a lower limit frequency and during a free interval between the one effective scanning interval and a subsequent effective scanning interval the supply of the drive signal is halted, the length of the free interval thereof being variably controlled according to the level of the first signal.

2. A system for processing optical information on an optical record medium, comprising:

(a) an acoustooptic deflector means which receives a drive signal, the drive signal being such that a frequency thereof is changed in a saw-tooth waveform, wherein a sonic pattern is formed in response to the drive signal which travels in a predetermined direction with time in the acoustooptic deflector, and wherein a diffraction action of the sonic pattern causes a light flux irradiated from the acoustooptic deflector to converge into a scanning light beam to form a light spot for scanning on record tracks formed on the optical record medium;

(b) first means for detecting, during the scanning of the light spot on each record track, a tracking error by which a scanning trajectory of the light spot is deviated from a center line of each record track and producing a first signal whose level corresponds to the tracking error detected by the first means;

(c) second means for controlling a timing of the drive signal supplied to said acoustooptic deflector means based on the tracking error detected by the first means, wherein the timing at which one effective scanning interval of the light spot on one record track defined by the change in the frequency of the drive signal starts subsequent to an end of a effective scanning interval of the light spot on a preceding record track, wherein the level of the first signal equals a predetermined level corresponding to a just tracking state when the scanning trajectory of the light spot is aligned with the center line of the one record track, has a level lower than the predetermined level and corresponding to an advanced state when the scanning trajectory of the light spot is advanced in a direction of a running of the optical record medium from the center line of the one record track and has a level higher than the predetermined level and corresponding to a retarded state when the scanning trajectory is retarded in a direction opposite to the optical record medium running direction;

wherein the second means includes a phase compensator for compensating a phase of the first signal, a first voltage-controlled oscillator for producing a second signal whose rise period is changed according to the level of the first signal, a saw-tooth wave signal generator for producing a third signal whose level is changed according to the frequency of the second signal, and a second voltage-controlled oscillator for producing the drive signal supplied to said acoustooptic deflector means, wherein the frequency of the drive signal is changed according to the level change of the third signal; and wherein the drive signal derived from the second voltage-controlled oscillator is such that during the one effective scanning interval the frequency of the drive signal starts to decrease at a predetermined rate to a lower limit frequency and then rises directly to an upper limit frequency and during a free interval between the one effective scanning interval and the subsequent effective scanning interval the supply of the drive signal is halted, the length of the free interval thereof being variably controlled according to the level of the first signal.

3. A system as set forth in claim 1, wherein the phase compensator includes a low-pass filter.

4. A system as set forth in claim 2, wherein the phase compensator includes a low-pass filter.

5. A system as set forth in claim 1, wherein the first means includes additional tracking patterns formed on the optical medium between the elongated ends of the optical record medium and ends of each record track for detecting the tracking error during the free interval.

6. A system as set forth in claim 2, wherein the first means includes additional tracking patterns formed on the optical medium between the elongated ends of the optical record medium and ends of each record track for detecting the tracking error during the free interval.

7. A system as set forth in claim 3, wherein the optical medium comprises a tape which runs at a constant speed.

8. A system as set forth in claim 4, wherein the optical medium comprises a tape which runs at a constant speed.

9. A method for processing optical information on an optical record medium, comprising the steps of:

(a) supplying a drive signal to an acoustooptic deflector, the drive signal being such that a frequency thereof is changed in the form of a saw-tooth wave so that a sonic pattern is formed, wherein the sonic pattern travels in a predetermined direction within the acoustooptic deflector and wherein a diffraction of the sonic pattern causes a light flux irradiated from the acoustooptic deflector to converge into a scanning light beam, thus forming a light spot for scanning on a record track on the optical medium;

(b) detecting a tracking error of the light spot with respect to the record track;

(c) controlling the timing at which one effective scanning interval of the light spot for the adjacent record track is started subsequent to the effective scanning interval for the one record track; and (d) repeating the steps (a) to (c) for the adjacent record track;

wherein step (b) further includes the steps of:
producing a first signal having a level which corresponds to the detected tracking error;

wherein step (c) further includes the steps of:
phase compensating the phase of the first signal;
producing a second signal whose rise period is changed according to the level of the first signal;
producing a third signal whose level is changed according to the frequency of the second signal; and
producing a drive signal whose frequency is changed according to the level change of the third signal such that during the one effective scanning interval the frequency of the drive signal starts to increase at a predetermined rate to an upper limit frequency and then falls directly to a lower limit frequency and during a free interval between the one effective scanning interval and a subsequent effective scanning interval the supply of the drive signal is halted, the length of the free interval thereof being variably controlled according to the level of the first signal.

* * * * *